L. ROTENBERG.
MANIFOLDING SALES BOOK.
APPLICATION FILED DEC. 26, 1916.

1,218,700.

Patented Mar. 13, 1917.
3 SHEETS—SHEET 1.

Inventor
Louis Rotenberg,
By
C. E. Humphrey
Attorney

L. ROTENBERG.
MANIFOLDING SALES BOOK.
APPLICATION FILED DEC. 26, 1916.

1,218,700.

Patented Mar. 13, 1917.
3 SHEETS—SHEET 2.

Inventor
Louis Rotenberg,
By C. E. Humphrey
Attorney

L. ROTENBERG.
MANIFOLDING SALES BOOK.
APPLICATION FILED DEC. 26, 1916.

1,218,700.

Patented Mar. 13, 1917.
3 SHEETS—SHEET 3.

Inventor
Louis Rotenberg,
By C. E. Humphrey
Attorney

UNITED STATES PATENT OFFICE.

LOUIS ROTENBERG, OF AKRON, OHIO.

MANIFOLDING SALES-BOOK.

1,218,700. Specification of Letters Patent. Patented Mar. 13, 1917.

Application filed December 26, 1916. Serial No. 138,836.

*To all whom it may concern:*

Be it known that I, LOUIS ROTENBERG, a citizen of the United States, residing at Akron, in the county of Summit and State of Ohio, have invented new and useful Improvements in Manifolding Sales-Books, of which the following is a specification.

This invention relates to improvements in manifolding books.

It pertains, generally, to manifold sales and order books; particularly, to that class of order books employed for keeping continuous record of the transactions between a merchant and a customer. In such use one of the books is issued for each customer either to be retained by him to be brought to the merchant each time a purchase is made, or to be kept by the merchant for the same purpose.

Briefly, it will be stated that the commonly employed manifolding books for the use of retail merchants in their transactions with customers are not provided with means whereby the total amount due from the customer to the merchant is carried onto the next succeeding sheet and therefore at the time of a quick settlement of an account, which frequently happens during the rush hours at the end of a week, the merchant picks up or seizes the wrong sheet and hence the total amount due the merchant is not shown and if not shown he must take the time and trouble to add up the totals of the various sheets in order to arrive at the amount of the account due between the customer and himself.

The object of the invention, then is to provide a manifolding book having superposed sheets comprising alternating original and carbon copy sheets with the rear face of the originals coated with a transfer material so as to duplicate the record on the copy sheet which latter is given to the customer at each transaction. Furthermore, there is provided at the top of each pair of sheets comprising an original and a copy sheet a space in which the total amount of the account may be entered, and which amount is carried by the carbon on the back of the original sheet onto the copy sheet for the use of the customer. Ordinarily the copy sheet is unprovided with carbon to prevent the transfer of the first record from being carried through onto the next succeeding original sheet. This provision prevents the carrying forward to the next original sheet of the total amount due and to overcome this objection there is provided on the rear face of each copy sheet a carbonized area arranged immediately in register with the space on the original sheet so that when the total amount due is entered on the first original sheet it is carried through by means of the carboned area onto the next succeeding original sheet and the second copy sheet. By arranging these various spaces and their corresponding carboned areas on the copy sheet out of register with each other, the amounts of successive transactions as well as the total amount due will be carried throughout the entire book.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a perspective view of a manifolding book embodying this invention, showing the same in its closed position.

Figs. 3–10 are detailed enlarged views of the first few sheets in the book with suitable indicia thereon for assisting in the description and explanation of the invention.

Figure 1:
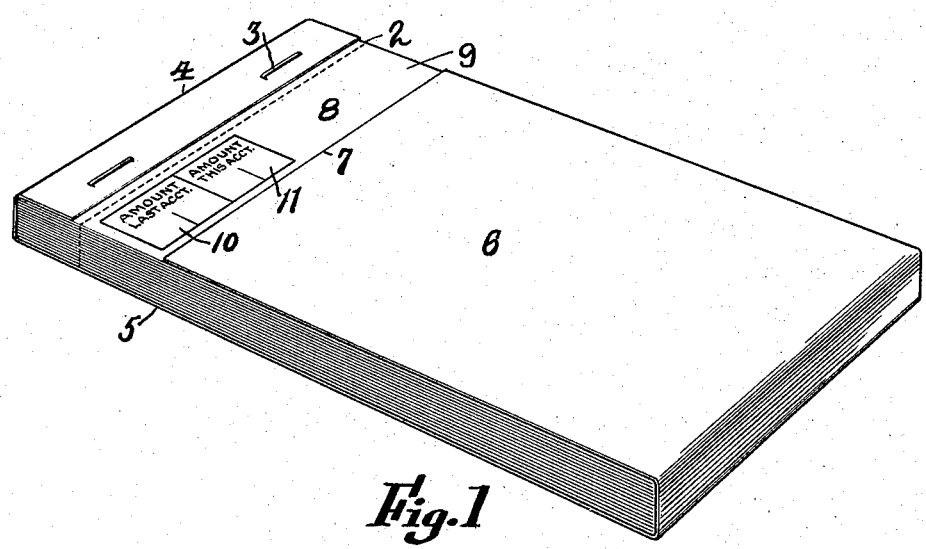
Figure 2:
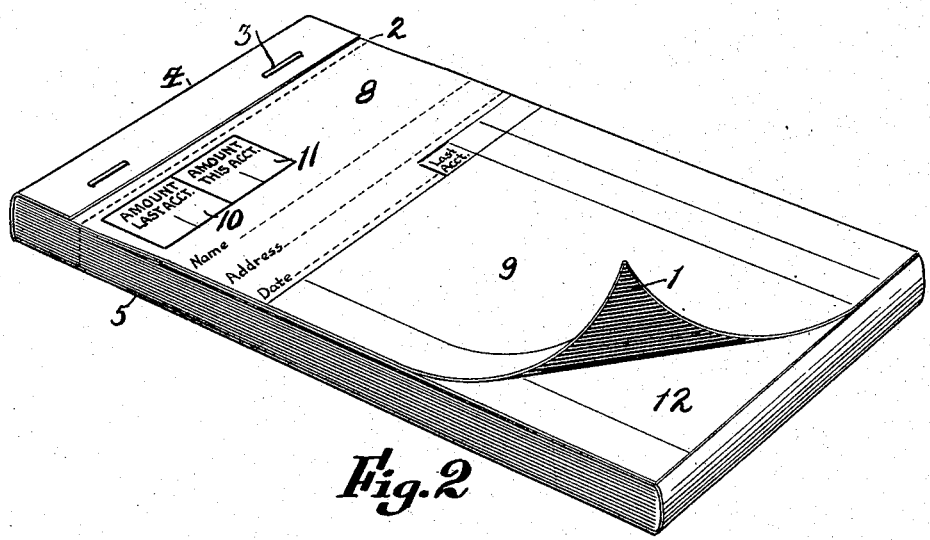
Fig. 2 is a view similar to Fig. 1 with the book in its open position and ready for recording the first commercial transaction between the merchant and the customer.

The book which forms the subject matter of this invention consists of a stack or pad of superposed sheets which for ease of description will be denominated original and copy sheets alternating in position with respect to each other and with the under faces of the originals coated with a carbon transfer material at 1. The original sheets as well as the copy sheets may be provided with suitable lines and spaces for the placing thereon of suitable memoranda connected with or showing each transaction. The sheets are all perforated at line 2 to permit the lower portions of the sheets and their copies to be torn from the book. The sheets are bound together into a book by holding means 3 and the stub portions are inclosed by a folder or cover 4, which extends downwardly and forms a stiffening member 5 for supporting the sheets when in use. The flap or free end 6 of the cover is arranged to inclose the free ends of the various sheets and when folded down upon the upper sheet terminates at the line 7 at a point remote from the perforated line 2 to provide an uncovered space 8 on each of the sheets. In practice after each transaction the original sheet with the record of the transaction is retained by the merchant and filed away in a suitable receptacle for future reference and the copy sheet next below is handed to the customer to permit him to keep a record of all transactions with this particular merchant. The book itself may be retained by the merchant or by the customer as desired. In the space marked 8 on the upper face of the first original sheet 9 are two spaces 10 and 11 preferably placed near the left end of the space 8 and preferably designated by such matter as the words "Amount last account", "Amount this account". In recording the first transaction employing this book the flap or loose end 6 of the cover is folded back and inserted between the first copy sheet 12 and the next original sheet 13. It will be pointed out that the free end 7 of the flap does not extend to the space 8 for a reason which will appear later. The copy sheet 12 is provided on its under face with a patch or area 14 of carbon transfer material so positioned as to be in vertical register or alinement with the spaces 11 and 15 on the sheets 9 and 12 respectively containing the words "Amount this account". The first transaction which is recorded in the book and used for illustrative purposes consists of a sale of goods to John Smith, amounting in all to $1.85 which amount is placed at the bottom of the column containing the items of the account and is also entered in the space marked "Amount this account". The recording of the order on the original sheet 9 duplicates the same on the copy sheet 12, as well as the entry of the amount of this account in the spaces 11 and 15 respectively on the copy sheet which is directly over the carbon transfer area 14 which reproduces the amount of $1.85 in the space 16 on the next original sheet 13 which space is in direct register with the carbon area 14 marked "Amount last account" but which it will be noted is out of register with the space 17 entitled "Amount last account" on the first sheet 9 of the book. From this it will be seen that the customer has a carbon copy of his transaction with the total amount thereon, and the total amount due the merchant appears at the head of the copy sheet in space 15. The merchant retains the sheet 9 for his use and he also has written or duplicated on the next original sheet 13 in the book in the space 16 headed by the words "Amount last account" the total amount of the first transaction and the book is then ready for reuse. At the second transaction with the customer the flap 6 is inserted between the copy sheet 18, see Fig. 7, and the next succeeding original sheet 19, see Fig. 8. Before entering the next transaction the dealer places the amount of the first sale $1.85 in the space 20 at the head of the column used for placing the various items on the second original sheet 13 so as to facilitate the adding up of the total amount due which would include the previous amount due and the amount entered as a result of the second transaction on the original sheet 13. Assuming for illustration that the second transaction together with the previous amount due, $1.85 amounts to $4.41 the dealer enters the amount $4.41 in the space 21 entitled "Amount this account". The entire record on the sheet 13 below the space 8, is transferred to the copy sheet 18 by means of carbon on the under face of the sheet 13. The under face of the carbon sheet 18 of the copy sheet is provided with a carboned area 22 in direct register with a space 23 on the next original sheet 19, this space bearing suitable indicia such as "Amount last account". The entering of the amount $4.41 in the space 21 on the sheet 13 reproduces through the medium of the carboned area 22 the amount $4.41 in the space 23 on the sheet 19 which is the next original sheet for use. Before using this sheet for the succeeding transaction the amount, $4.41 is entered in the space 24 at the head of the column for various items for the present transaction and which when added to the sale record on sheet 19 will bring the total of the present account to $6.22 which is placed in the space 25 on the original sheet 19. The record of the sale transaction on sheet 10 is transferred by the carboned under face thereof to the next copy sheet 30, see Fig. 9. This sheet 30 is provided with a carboned area 31 immediately in register with the space 25 on the sheet 19 and the next original sheet 32 is provided with a space 33 entitled "Amount last account" immediately in register with the carboned area 31 so that the amount $6.22 is thereby reproduced in the space 33. The next transaction is recorded on the original sheet 34 and amounts with the previous account of $6.22 to $13.08 which is recorded in a space 35 positioned to the left of the main space 8 and this is carried through by means heretofore described onto the next succeeding original sheet and the same transaction with respect to future dealings is thus recorded. It will be noted that the carboned areas on succeeding original sheets are progressively out of register and are positioned laterally stepwise throughout the book so that the total transaction duplicated from the first original sheet 9 onto the second original sheet 13 will be placed accurately in the proper space 16 thereof but will not be duplicated through onto the third original sheet 19 by reason of the fact that the carboned area 22 on copy sheet 18 is out of register with the carboned area 14 of sheet 12 and hence further duplication of the matter placed in the space 11 of the sheet 9 will extend no farther than sheet 13. If at any time the merchant desires to ascertain the amount due him from the customer it is simply necessary to refer to the last filed slip or sheet on which the last transaction of the customer has been recorded. Furthermore, the merchant has at all times on the first or upper original sheet of the book the amount of the last transaction or account with the customer as well as the total amount due, thereby providing an efficient and true record of the dealings with each customer and one which will reduce the time necessary for ascertaining the amount of each transaction.

I claim,

1. A manifolding account book comprising a plurality of superposed sets of original and copy sheets suitably bound together, a back secured to said book at its bound end, an integral flap extending from the opposite end of the back and adapted to be inserted between adjacent sets and partially overlap the under sets, the under face of each original sheet being covered with transfer material and the upper faces of said sheets being provided with a designated place of entry for the total amount of the customer's account on said sheet, a place of entry for the total amount then due, each copy sheet of each set being provided on its under face with an isolated area of transfer material positioned in registration with the space on the original sheet of said set designated for the total amount due on the original sheet, the positions of the entry spaces and complemental areas of transfer material on the sheets of each set being progressively shifted out of alinement with similar spaces and areas of other sets, whereby said total amount is duplicated on each copy sheet from said original entry and on the next succeeding original sheet through the isolated area of transfer material on said copy sheet, and the duplication of said total amount on other succeeding sets is avoided by said progressive shifting of said spaces and areas.

2. A manifolding account book comprising a plurality of superposed sets of original and copy sheets suitably bound together, the under face of each original sheet being covered with transfer material and the upper face of each sheet provided with a designated place of entry for the total amount of the customer's account, each copy sheet of each set being provided on its rear face with an isolated area of transfer material positioned in registration with the place of entry on the original sheet of said set designated for the total amount due, the positions of the entry spaces and complemental areas of transfer material on the sheets of each set being progressively shifted out of alinement with similar spaces and areas of other sets, whereby said total amount is duplicated not only on said copy sheet by said original entry but also on the next succeeding original sheet through the isolated area of transfer material on said copy sheet, and the duplication of said total amount on other succeeding sets is avoided by said progressive shifting of said spaces and areas.

3. A manifolding account book comprising a plurality of superposed sets of original and copy sheets suitably bound together and alternately arranged, the rear face of each original sheet being covered with transfer material and the upper front face of each sheet provided with a designated place of entry for the total amount due, each copy sheet of each set being provided on its rear face with an isolated area of transfer material positioned in registration with the space on the original sheet of said set designated for the total amount due on the original sheet, the positions of the entry spaces and complemental areas of transfer material on the sheets of each set being progressively shifted out of alinement with similar spaces and areas of other sets, whereby the duplication of said total amount on other succeeding sets is avoided by said progressive shifting of said spaces and areas, the isolated areas of transfer material on the various copy sheets being out of registration with each other.

4. A manifolding account book comprising a plurality of superposed sets of original and copy sheets suitably bound together and alternately arranged, the under face of each original sheet being covered with transfer material and the upper face being each provided with a designated place of entry for the total amount of the customer's account, the designated places of entry on successive original sheets being out of registration with each other, each copy sheet of each set being provided on its rear face with an isolated area of transfer material positioned in registration with the space on the complementary original sheet of said set designated for the total amount due on the original sheet, whereby said total amount is duplicated on each copy sheet from said original entry and on the next succeeding original sheet through the isolated area of transfer material, the positions of the entry spaces and complemental areas of transfer material on the sheets of each set being progressively shifted out of alinement with similar spaces and areas of other sets, whereby the duplication of said total amount on other succeeding sets is avoided by said progressive shifting of said spaces and areas, the isolated area of transfer material on successive copy sheets being out of registration with one another but in registration with the complemental entry space on the original sheet of the set in which said copy sheet is contained.

In testimony whereof I have hereunto set my hand.

LOUIS ROTENBERG.

Copies of this patent may be obtained for five cents each, by addressing the "Commissioner of Patents, Washington, D. C."